United States Patent [19]

Tano

[11] 4,198,148
[45] Apr. 15, 1980

[54] DISPLAY DEVICE IN CAMERA VIEW FINDER

[75] Inventor: Eiichi Tano, Fukuoka, Japan

[73] Assignee: Asahi Kogaku Kogyo Kabushiki Kaisha, Tokyo, Japan

[21] Appl. No.: 954,676

[22] Filed: Oct. 25, 1978

[30] Foreign Application Priority Data

Oct. 25, 1977 [JP] Japan .............. 52-143034[U]

[51] Int. Cl.² .................................. G03B 17/20
[52] U.S. Cl. ......................... 354/289; 354/23 D; 354/53
[58] Field of Search ............. 354/23 D, 53, 60 L, 354/289

[56] References Cited

U.S. PATENT DOCUMENTS

| 4,106,033 | 8/1978 | Nakamoto et al. | 354/23 D |
| 4,107,708 | 8/1978 | Saito et al. | 354/60 L |
| 4,112,440 | 9/1978 | Kanemaru et al. | 354/23 D |
| 4,132,985 | 1/1979 | Kitaura | 354/23 D X |
| 4,145,129 | 3/1979 | Kawamura et al. | 354/60 L X |

Primary Examiner—Michael L. Gellner
Attorney, Agent, or Firm—Sughrue, Rothwell, Mion, Zinn and Macpeak

[57] ABSTRACT

A display device in the view finder of a camera with display capability in which a read only memory is addressed by photographing data of the camera which have been converted into digital data. A display element is driven by output data from the read only memory to visually display the data such as shutter speed, f-stop, etc. The instruction which will completely turn off the display element is stored in said read only memory, and turning off the display element is controlled by addressing said read only memory.

9 Claims, 4 Drawing Figures

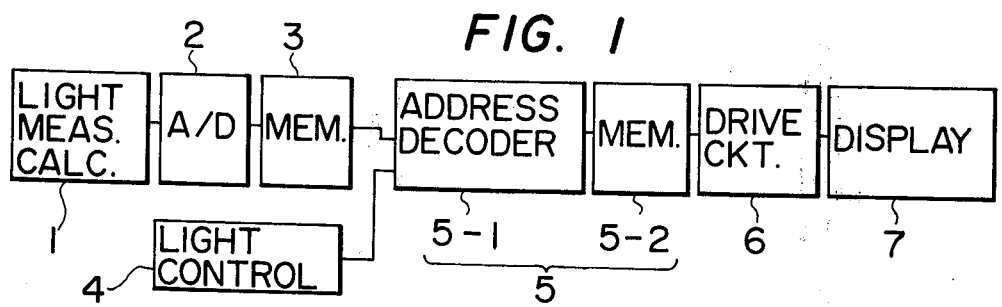
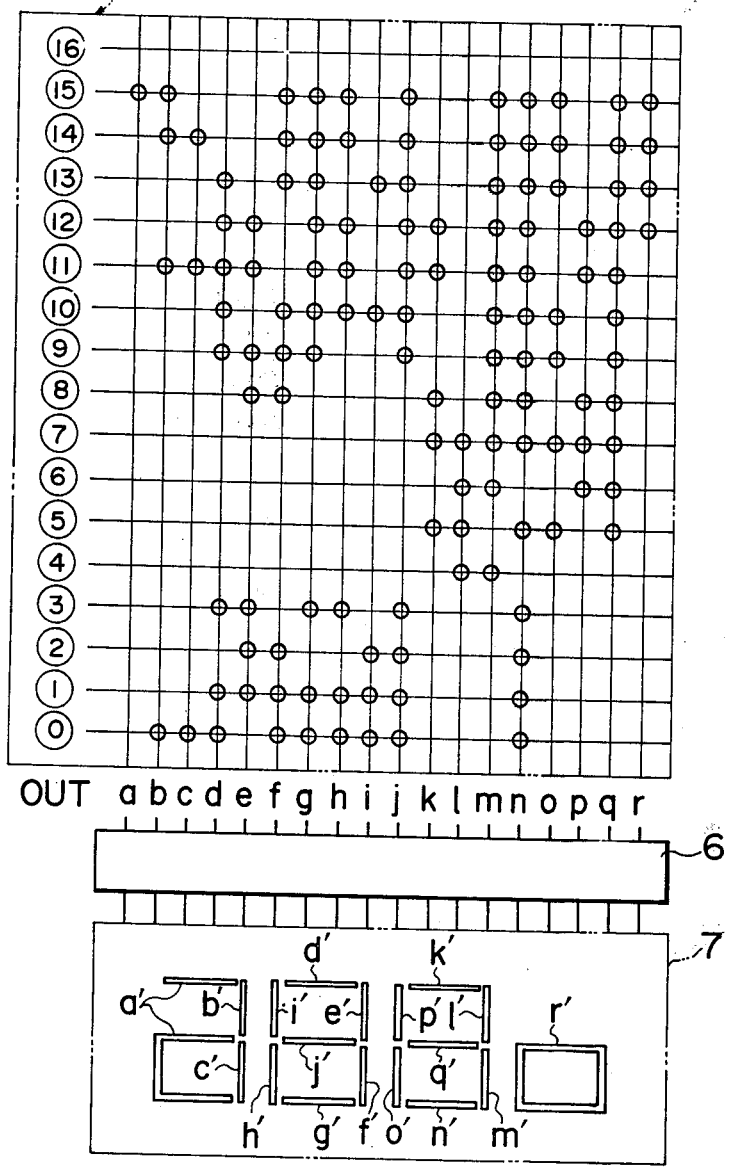

FIG. 4

| | |
|---|---|
| ⑯ | TURNED OFF |
| ⑮ | 2000 |
| ⑭ | 1000 |
| ⑬ | 500 |
| ⑫ | 250 |
| ⑪ | 125 |
| ⑩ | 60 |
| ⑨ | 30 |
| ⑧ | 15 |
| ⑦ | 8 |
| ⑥ | 4 |
| ⑤ | 2 |
| ④ | 1 |
| ③ | 2_ |
| ② | 4_ |
| ① | 8_ |
| ⓪ | 16_ |

DISPLAY DEVICE IN CAMERA VIEW FINDER

BACKGROUND OF THE INVENTION

As cameras have improved into high-grade, precision instruments, conventional methods of displaying sensed and measured photographing information are not acceptable. For example, methods utilizing an ammeter and a dot display method using a solid light emission element are not generally satisfactory in view of reliability, operability, and finder viewing condition. Accordingly, a technique has been defined in which numerals or symbols are displayed directly in the view finder by using a numeral or symbol display element. In most of the conventional methods of this type, the segments of the display element are driven by the output of a read only memory. Various different designs for such displays are used but the uses of such LED segments will consume about 10 times the electrical power over a dot display. Hence, power consumption presents a problem that must be dealt with when a sophisticated digital display is used.

SUMMARY OF THE INVENTION

An object of this invention is to provide a display device in the view finder of a camera in which all of the segments in the aforementioned display element are turned off prior to any new information to be displayed by specifying a particular address in the read only memory.

It is another object of this invention to provide a circuit that will minimize battery consumption in a camera digital display by blanking out the display at appropriate times.

Yet another object of this invention is to provide for a display cut-off circuit that will minimize power consumption by blanking out the display at times when no visual output is needed.

These and other objects of this invention are accomplished by having a display turn-off instruction stored in the read-only memory. A light control circuit is employed to access the memory to that instruction at appropriate times and blank-out the display. For example, when the mirror is up, the camera turned to "bulb" operation or the self timer is used, the operator will either not be looking through the view finder of the camera or cannot obtain any useful information. In addition, when the operator wishes to concentrate his attention on an object, all of segments in the display element should be turned off manually. Hence, power consumption can be minimized under these conditions by blanking out the digital display. This invention employs a control circuit that is responsive to such conditions to blank out the display by accessing the appropriate memory address for the blanking instruction.

This invention will be described in detail with reference to the drawings and the preferred embodiment that follows.

BRIEF DESCRIPTION OF THE DRAWINGS

FIG. 1 is a block diagram showing one embodiment of this invention;

FIG. 3 is a diagram showing one example of the memory and display element; and

FIG. 4 is a diagram showing examples of digital display, with the memory as indicated in FIG. 3.

DESCRIPTION OF THE PREFERRED EMBODIMENT

Figure 2:
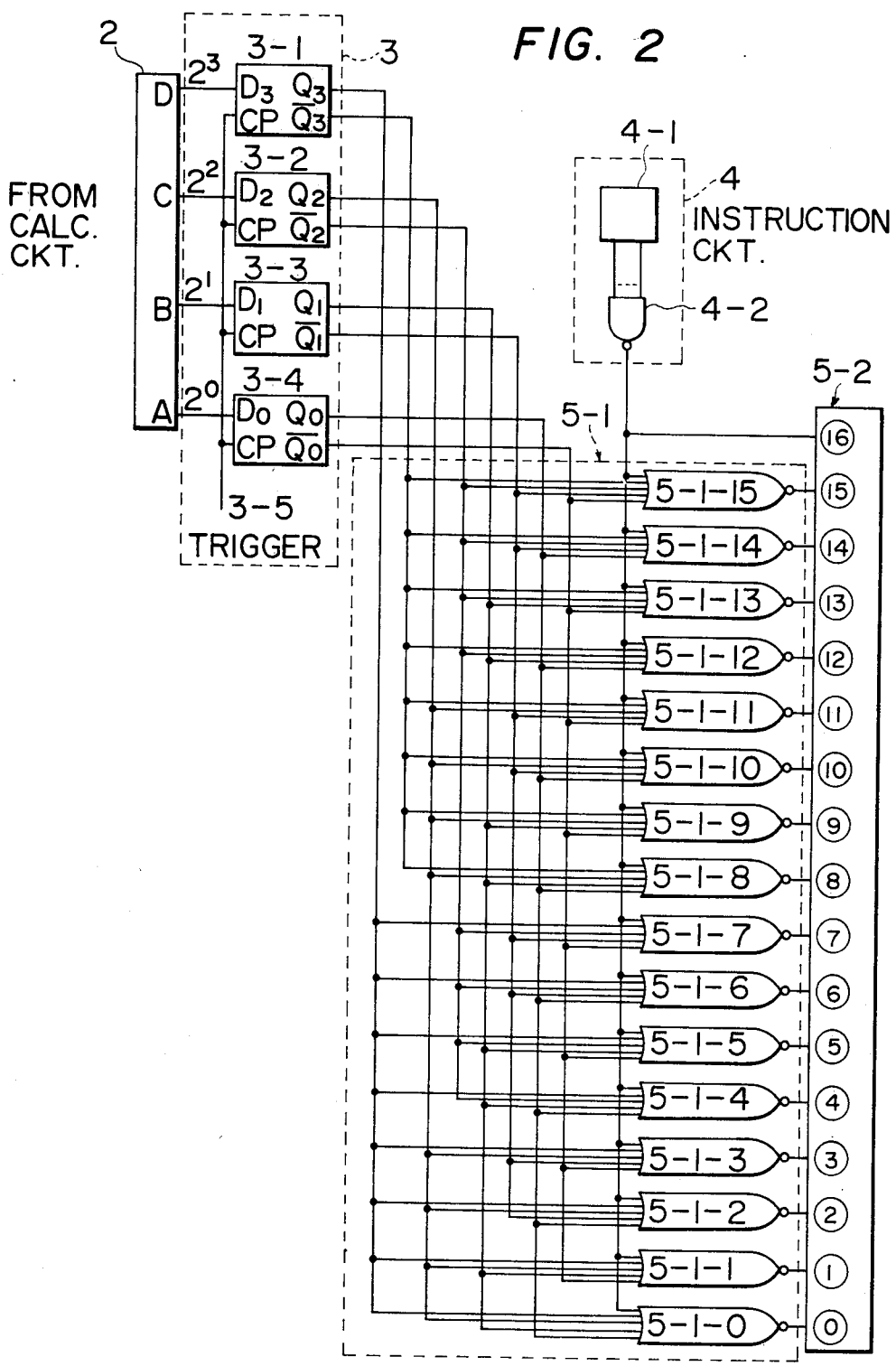
FIG. 2 is a block diagram showing one example of the memory circuit, light-turning-off control circuit and address decoder elements.

This invention will now be described in detail with reference to the accompanying drawings.

A first embodiment of the invention, as shown in FIG. 1, comprises: a light measurement calculation circuit 1; an analog-to-digital (A/D) converter circuit 2 coupled to the calculation circuit and a memory circuit 3 receiving the output of the converter. A light-turning-off control circuit 4 is used as one input to a read only memory (ROM) 5 having an address decoder 5-1 and a memory 5-2. The other input is the output from memory circuit 3. A drive circuit 6 receives ROM output for driving a display element 7.

The operation of the circuitry shown in FIG. 1 will be now described with reference to the case where an aperture preferred photographing system is employed. In such a system, the lens aperture is fixed at the desired value (f-stop) and the shutter speed is varied to ensure correct exposure for a given film speed (ASA number). In the light measurement calculation circuit 1, the analog data of object brightness ($B_V$), film sensitivity ($S_V$) and predetermined aperture value ($A_V$) are subjected to calculation according to an expression ($S_V + B_V - A_V$). The result of the calculation corresponds to a controlled shutter speed ($T_V$) and constitutes the output of calculation circuit 1. Such circuits are well known and need not be discussed herein. The analog data $T_V$ is applied to the A/D converter circuit 2, where it is converted into digital form. The digital output is then applied to the memory circuit 3 where it is stored, so that variations in display of the display element 7 will not be rapid tending to make the photographer uncomfortable as values change and are displayed. Also, in a single lens reflex camera, the display should not be changed as the mirror is elevated.

The output of the memory circuit 3 together with the output of the light-turning-off control circuit 4 is applied to the address decoder 5-1 to specify an address in the memory 5-2. In accordance with the contents in the memory thus addressed, the drive circuit 6 operates to drive segments in the display element 7 thereby to digitally display the shutter speed at which the film will be exposed. If, in the circuitry shown in FIG. 1, the address decoder 5-1 is designed so that priority is given to the light-turning-off signal of the light-turning-off control circuit 4 over the output of the memory circuit 3 in specifying addresses in the memory 5-2, then a light-turn-off address in the memory 5-2 is specified by the light-turning-off signal, and all the segments in the display element 7 are turned off.

FIG. 2 shows a definitive example of the memory circuit 3, light-turning-off control circuit 4 and address decoder 5-1. In this case, analog data from the calculation circuit are converted into 4-bit digital data in the A/D converter. The output bits A, B, C and D of the A/D converter circuit 2 have weights $2^0$, $2^1$, $2^2$ and $2^3$, respectively. If the A/D converter circuit 2 is designed in a known manner so that the following Table is obtained with respect to analog data $T_V$ according to an equation $S_V + B_V - A_V = T_V$, then shutter speeds ranges from 1/2000 to 16 seconds can be expressed by 4-bit digital data.

Table

| $T_v$ | D | C | B | A | shutter speed |
|---|---|---|---|---|---|
| 11 | H | H | H | H | 1/2000 |
| 10 | H | H | H | L | 1/1000 |
| 9 | H | H | L | H | 1/500 |
| 8 | H | H | L | L | 1/250 |
| 7 | H | L | H | H | 1/125 |
| 6 | H | L | H | L | 1/60 |
| 5 | H | L | L | H | 1/30 |
| 4 | H | L | L | L | 1/15 |
| 3 | L | H | H | H | ⅛ |
| 2 | L | H | H | L | ¼ |
| 1 | L | H | L | H | ½ |
| 0 | L | H | L | L | 1 |
| −1 | L | L | H | H | 2 |
| −2 | L | L | H | L | 4 |
| −3 | L | L | L | H | 8 |
| −4 | L | L | L | L | 16 |

In the Table, H is the voltage higher than the threshold voltage, and L is the voltage lower than the threshold voltage.

The outputs A, B, C and D of the A/D converter circuit 2 are applied to the terminals D of D-type flip-flops 3-4, 3-3, 3-2 and 3-1, respectively. A trigger signal generating circuit 3-5 operates to generate a trigger signal which is applied to the clock pulse terminals Cp of the flip-flops. In response to the trigger signal, the signal at the terminal D of each flip-flop is provided at its terminal Q and is stored. This trigger signal is a repetitive pulse having a frequency to an extent that variations in display will not make the photographer uncomfortable in the sense that rapid variations in display are distracting herein. The trigger signal can also be an electrical signal which is provided by a mechanical switch operated in association with the initial period of elevating the mirror to eliminate changes in display caused by elevation of the mirror.

The address decoder 5-1 is made up of NOR gates 5-1-0 through 5-1-15 to which the output $Q_0$ or $\overline{Q}_0$ of the flip-flop 3-4, the output $Q_1$ to $\overline{Q}_1$ of the flip-flop 3-3, the output $Q_2$ or $\overline{Q}_2$ of the flip-flop 3-2, the output $Q_3$ or $\overline{Q}_3$ of the flip-flop 3-1 and the output of the light-turning-off control circuit 4 are suitably applied. The outputs of these NOR gates 5-1-0 through 5-1-15 are supplied to addresses 0 through 15 in the memory 5-2.

The light-turning-off control circuit 4 comprises a light-turning-off instruction signal generating circuit 4-1 for producing an output comprising a light-turning-off instruction signal and a NAND gate 4-2 which receives the output of the light-turning-off instruction signal generating circuit 4-1. The circuit 4-1 is responsive to mechanical conditions in the camera such as a timer actuation or bulb operation wherein the display is not needed. When these conditions are sensed or when the photographer judges the display unnecessary, an output to the NAND gate is generated. The output of the NAND gate 4-2 is connected to the NOR gates 5-1-0 through 5-1-15 and to an address (16) in the memory 5-2. As will be explained, this will cause the digital display 7 to be blanked out.

The operation of the circuitry in FIG. 2 thus organized will now be described. When all the inputs of the NAND gate 4-2 are at the "H" level, and the outputs of the memory circuit 3 are: $Q_0$="L," $Q_1$="H," $Q_2$="L" and $Q_3$="H", only the output of the NOR gate 5-1-10 is at the "H" level and only the address 10 among the addresses 0 through 16 of the memory 5-2 is raised to the "H" level. Thus, the address (10) is specified. When $Q_0$="H," $Q_1$="H," $Q_2$="L" and $Q_3$="L," only the output of the NOR gate 5-1-3 is at the "H" level, and the address 3 in the memory 5-2 is specified. Similarly, as in the above-described cases, only one of the addresses 0 through 16 is raised to the "H" level according to the contents of the outputs $Q_0$ through $Q_3$ to specify an address in the memory.

When at least one bit in the output of the light-turning-off instruction signal generating circuit 4-1 is lowered to the "L" level, the output of the NAND gate 4-2 is raised to the "H" level. As a result, the address 16 is raised to the "H" level, and in addition all of the outputs of the NOR gates 5-1-0 through 5-1-15 are changed to the "L" level independently of the contents of the flip-flops. Accordingly, the address 16 has been specified. That is, the address 16 is specified with the output of the signal generating circuit 4-1 taking precedence over all other outputs and all NOR gate outputs will be at a low level.

Referring now to FIG. 3, an example of the memory 5-2 and display element 7 are shown. In FIG. 3, among the intersections of the address lines of the memory 5-2 and the output lines (OUT), intersections encircled are at the "H" level. The display element 7 comprises segments a' through r' which are provided in correspondence to the outputs a through r of the memory 5-2 which are designated by the intersections at the "H." The drive circuit 6 is designed to permit the display element 7 to display shutter speeds. The display may be LED's, LCD's or the like.

If, in this case, it is assumed that all the inputs of the NAND gate 4-2 are at the "H," and $Q_0$="L," $Q_1$="H," $Q_2$="L" and $Q_3$="H" levels as in the above-described case, then the address (10) is specified, and the outputs d, f, g, h, i, j, m, n, o and q of the memory 5-2 (FIG. 3) are at the "H" level along the address line of the address (10). Accordingly, the drive circuit 6 drives the segments d', f', g', h', i', j', m', n', o' and q' to an "on" condition in the display element 7. As a result a numeral "60" is formed and displayed, that is, a digital display corresponding to a shutter speed of 1/60 is carried out as indicated in the Table. Similarly, digital displays are carried out with respect to the other address lines to display various shutter speeds. Display examples are shown in FIG. 4, with the contents of the memory 5-2 as shown in FIG. 3.

When the output of the light-turning-off control circuit 4 is at the "H" level as was described herein, so that the display is not required, only the address line (16) is specified. However, as shown, the address line (16) has no "H" intersections and all the display segments are accordingly turned off. Thus, since the address line (16) stores contents indicating that all the display segments are blanked, that is receiving no illuminating voltage, if the address (16) is specified by data from the light-turning-off control circuit 4, the display will be turned off entirely.

While the invention has been described with reference to the case where an aperture preferred photographing system is employed, the technical concept of the invention can also be similarly applied to the shutter preferred system of photography. Shutter preferred systems set a predetermined shutter speed and then by similar calculation as described herein, vary the aperture to properly expose the film for a given ASA number. In the case where the shutter preferred photographing system is employed, the same effect can be obtained by designing the light measurement calculation circuit 1 to perform a calculation $(S_V+B_V)-T_V$. The design of the address decoder 5-1 is similar as in the above-described case, and the contents of the memory are merely changed to display aperture values for example f32 to f1.2 depending on the lens used. Furthermore, in the case where a manual photographing system is employed, that is, the traditional "matched needle" type of display for coordinating shutter speed with f-stop, the same effect can be obtained by designing the light measurement calculation circuit 1 to perform a calculation $(T_V+A_V)-(S_V+B_V)$. The design of the address decoder 5-1 would be the same as in the above-described two cases, and the contents of the memory would be changed to display values of deviation from correct exposure values.

Finally, in the case also where the three photographing systems; aperture preferred photographing, shutter preferred photographing system and manual systems are provided in one camera in such a manner that the systems are switched as desired, all of the segments in the display element can be turned off. As in the above-described cases, the circuitry can be formed as follows: The information of the light-turning-off control circuit 4 is used as an input to the address decoder 5-1 and when the output of the circuit 4 is at the "H," the light-turning-off address line is specified independently of the digital data obtained through analog-to-digital conversion in the A/D converter circuit 2.

Hence, according to this invention, merely by permitting a part of the read only memory to store the contents which will turn off all the segments in the display element, the light-turning-off circuit can be a simple circuit design. The design may easily be incorporated into an IC module.

The specific design of the light-turning-off instruction signal generating circuit forms no part of this particular invention. An example of a basic circuit responsive to camera conditions such as timer initiation and bulb operation and generating an output signal are found in co-pending application Ser. No. 954,677 entitled "CAMERA DISPLAY DEVICE IN VIEW FINDER," and filed on the same day as this application.

It is apparent that variations and modifications are possible without departing from the essential scope of this invention.

What is claimed is:

1. In a display device disposed in the view finder of a camera having a photography calculation circuit, a digital display and a read only memory addressed by the output of the calculation circuit to provide output data to drive said digital display, the improvement comprising means cooperating with said read only memory for turning-off said digital display when said read only memory is addressed to an appropriate instruction, wherein said read only memory comprises an address decoder and a memory, said address decoder comprising an array of NOR gates, and wherein said means cooperating with said read only memory generates an output to change the outputs of said array of NOR gates to a low level irrespective of the output of said calculation circuit and said memory instruction will blank out said digital display.

2. The display device of claim 1 wherein the output of said calculation circuit is data indicative of a shutter speed for a proper exposure and said digital display displays said shutter speed.

3. The display device of claim 1 wherein the output of said calculation circuit is data indicative of an aperture value for a proper exposure and said digital display displays said aperture value.

4. The display device of claim 1 wherein the output of said calculation circuit is data indicative of a deviation from a corret exposure value from a predetermined shutter speed and aperture value and said digital display displays said deviation.

5. In a display device disposed in the view finder of a camera having a photography calculation circuit, a digital display and a read only memory addressed by the output of the calculation circuit to provide output data to drive said digital display, the improvement comprising means cooperating with said read only memory for turning-off said digital display when said read only memory is addressed to an appropriate instruction, wherein said means cooperating with said read only memory comprises a signal generating circuit and a NAND gate, the output of said NAND gate being delivered to said read only memory to take precedence over any output from said calculation circuit, whereby when the output of said NAND gate is at a low level, said digital display will be blanked out by reading out an address to turn-off said digital display.

6. The display device of claim 5 wherein said calculation circuit comprises calculation means to determine the proper exposure, an analog to digital converter receiving the output of said calculation means and means to store the digital output of said analog to digital converter.

7. The display device of claim 5 wherein said read only memory comprises an address decoder and a memory, said address decoder comprising an array of NOR gates.

8. The display device of claim 5 wherein said digital display comprises series of LED segments arranged to provide a digital format output.

9. The display device of claim 8 wherein said read only memory comprises an address decoder and a memory wherein a specific address is decoded from the output of said calculation circuit and the memory location corresponding to the decoded address is used to drive said digital display.

* * * * *